United States Patent
Sato et al.

(10) Patent No.: US 8,436,742 B2
(45) Date of Patent: May 7, 2013

(54) INDICATOR

(75) Inventors: Yuzuru Sato, Tokyo (JP); Takayuki Ite, Tokyo (JP); Toshiaki Kobayashi, Tokyo (JP)

(73) Assignee: Nagano Keiki Co., Ltd., Tokyo (JP)

( * ) Notice: Subject to any disclaimer, the term of this patent is extended or adjusted under 35 U.S.C. 154(b) by 789 days.

(21) Appl. No.: 12/578,858

(22) Filed: Oct. 14, 2009

(65) Prior Publication Data

US 2010/0090859 A1 Apr. 15, 2010

(30) Foreign Application Priority Data

Oct. 15, 2008 (JP) ................. 2008-266912

(51) Int. Cl.
*G08B 5/00* (2006.01)
(52) U.S. Cl.
USPC ............ 340/815.4; 340/693.5; 340/815.45
(58) Field of Classification Search ........... 340/815.4, 340/815.42, 815.43, 815.45, 691.6, 693.5; 345/30, 33, 34, 44, 46, 82, 87; 362/276, 362/800, 802
See application file for complete search history.

(56) References Cited

U.S. PATENT DOCUMENTS 5,068,652 A * 11/1991 Kobayashi ............... 340/815.43

FOREIGN PATENT DOCUMENTS

| CN | 1872573 A | 12/2006 |
|---|---|---|
| JP | 35-014468 Y | 6/1960 |
| JP | 04-204132 A | 7/1992 |
| JP | 3037590 U | 5/1997 |
| JP | 2002-48666 | 2/2002 |
| JP | 2005-260868 | 9/2005 |
| JP | 2006-084190 A | 3/2006 |
| JP | 2006-308578 A | 11/2006 |

* cited by examiner

*Primary Examiner* — Thomas Mullen
(74) *Attorney, Agent, or Firm* — Rankin, Hill & Clark LLP

(57) ABSTRACT

A numeral-displaying face provided with a numeral-display and an exterior wall intersecting a periphery of the numeral-displaying face are provided on a cover and a case body of an indicator. A monitor indicator for checking an operating condition of the indicator is provided on the exterior wall. An outer circumference of the monitor indicator is flush with the exterior wall. A fallen object does not collide with the monitor indicator, so that damage on the monitor indicator can be prevented.

9 Claims, 11 Drawing Sheets

INDICATOR

The entire disclosure of Japanese Patent Application No. 2008-266912, filed Oct. 15, 2008, is expressly incorporated by reference herein.

BACKGROUND OF THE INVENTION

1. Field of the Invention

The present invention relates to an indicator provided with a numeral-displaying face having a numeral-display and an exterior wall.

2. Description of Related Art

An indicator such as a pressure indicator is provided with a numeral-display for numerically displaying a measured value. The numeral-display digitally displays a detected measured value. Based on the digitally displayed value, whether the measured value is within a tolerable range or not (i.e. in a dangerous range) is read.

The numeral-display is typically provided on a front side of an indicator. Accordingly, the measured value can only be seen from the front side, where the measured value cannot be read from lateral and back sides. However, since such an indicator forces an operator to digitally read whether the measured value is within the dangerous range or not and since the display is provided only on the front side of the indicator, the operator at the lateral or back of the indicator cannot visually recognize the dangerous range of the measured value.

In order to overcome the above deficiencies, a digitally displaying indicator is typically provided on a front side of a casing and an alarm indicator is also typically provided on an upper side of the casing that is lit to issue an alarm when the detected value is out of a predetermined range (see document 1: JP-A-2002-48666 (FIG. 5)).

The alarm indicator of the above indicator protrudes from an upper side of the casing so as to allow visual recognition of the alarm display in a direction in which the digital display cannot be seen.

The alarm indicator disclosed in the document 1 is provided in a substantially spherical shape on the upper side of the casing in order to improve the visibility thereof.

However, when the alarm indicator protrudes from the casing, the alarm indicator may be damaged when a fallen object collides with the alarm indicator in error.

SUMMARY OF THE INVENTION

An object of the invention is to provide an indicator of which monitor indicator is less likely to be damaged in error.

An indicator according to an aspect of the invention includes: a housing that has a numeral-displaying face including a numeral-display and an exterior wall intersecting a periphery of the numeral-displaying face; and a monitor indicator provided on the exterior wall that is used for checking an operating condition of the indicator, the monitor indicator including an outer circumference that is flush with the exterior wall or is recessed relative to the exterior wall toward an inside of the housing.

According to the above aspect of the invention, since the monitor indicator is provided on the exterior wall intersecting the numeral-displaying face, the operating condition of the indicator (e.g. dangerous range of a displayed value) can be visually checked at a location from which the numeral-display cannot be seen. Additionally, by displaying the monitor indicator with a predetermined color (e.g. red), it can be immediately recognized that monitor indicator shows a dangerous condition.

Further, since the outer circumference of the monitor indicator is flush with the exterior wall or is recessed relative to the exterior wall, a fallen object does not collide with the monitor indicator, so that the damage on the monitor indicator can be reduced.

In the above aspect of the invention, the exterior wall is preferably provided by a plurality of planes continuous with each other, at least one of the plurality of planes being provided with the monitor indicator.

According to the above arrangement, since the housing of the indicator has a polygonal profile and the monitor indicator is provided on at least one of the plurality of planes defining the exterior wall, the monitor indicator can be easily visually checked. When the indicator is disposed so that the plane provided with the monitor indicator faces a pathway, an operator passing through the pathway for routine checking and the like can fully visually check the monitor indicator without seeing the numeral-display, thereby immediately recognizing an abnormal condition.

In the above aspect of the invention, the monitor indicator is continuously extended to two or more adjacent ones of the plurality of planes.

According to the above arrangement, since the monitor indicator can be seen in two different directions, the visibility of the monitor indicator can be enhanced.

In the above aspect of the of the invention, a light source of the monitor indicator is preferably an LED that is continuously lit or is flashed.

According to the above arrangement, since an LED consumes less power and has a long lifetime, the indicator can be manufactured with a lower cost. Further, since a combination of a plurality of colors is easily displayed with the use of LED, a variety of colors can be created. Further, the visibility of the indicator can be further enhanced by continuously lighting or flashing the LED.

In the above aspect of the invention, a circuit for driving the monitor indicator and a circuit for driving the numeral-display are preferably installed on a single printed circuit board.

With the above arrangement, since it is not necessary to separately wire the monitor indicator and the numeral-display, the size of the indicator can be reduced and the manufacturing process of the indicator can be simplified.

In the above aspect of the invention, the housing preferably includes a first housing and a second housing that are separated in a direction intersecting the exterior wall, the monitor indicator being held between the first housing and the second housing.

With the above arrangement, since the monitor indicator is held between the two housings, the both sides of the monitor indicator are protected by the housings, so that the monitor indicator is less likely to be damaged.

In the above aspect of the invention, a controller that turns off the numeral-display while lighting only the monitor indicator is preferably provided.

According to the above arrangement, since the numeral-display is turned off, the power consumption can be reduced. For instance, when the numeral-display is provided by LEDs, the numeral-display is turned off to save power. Even when the numeral-display is turned off, since the monitor indicator is lit, abnormality and the like in the measured value can be checked via the monitor indicator. When the numeral-display is provided by a combination of an LCD and LED, by turning off the backlight of the LED, the power consumption can be reduced. When the numeral-display is provided only by LCD, the lifetime of the product itself can be lengthened by suspending the operation of the LCD.

An operation mode in which both of the numeral-display and the monitor indicator are lit and another operation mode in which the numeral-display is turned off while the monitor indicator is lit are set in a selection mode.

In the above aspect of the invention, the exterior wall is preferably curved, the monitor indicator being provided along a circumference of at least a part of the curve.

With the above arrangement, since the monitor indicator is provided on a seamlessly continuous curve, the visibility of the monitor indicator is enhanced.

DETAILED DESCRIPTION OF PREFERRED EMBODIMENT(S)

A first exemplary embodiment of the invention will be described below with reference to the attached drawings.

Figure 1:
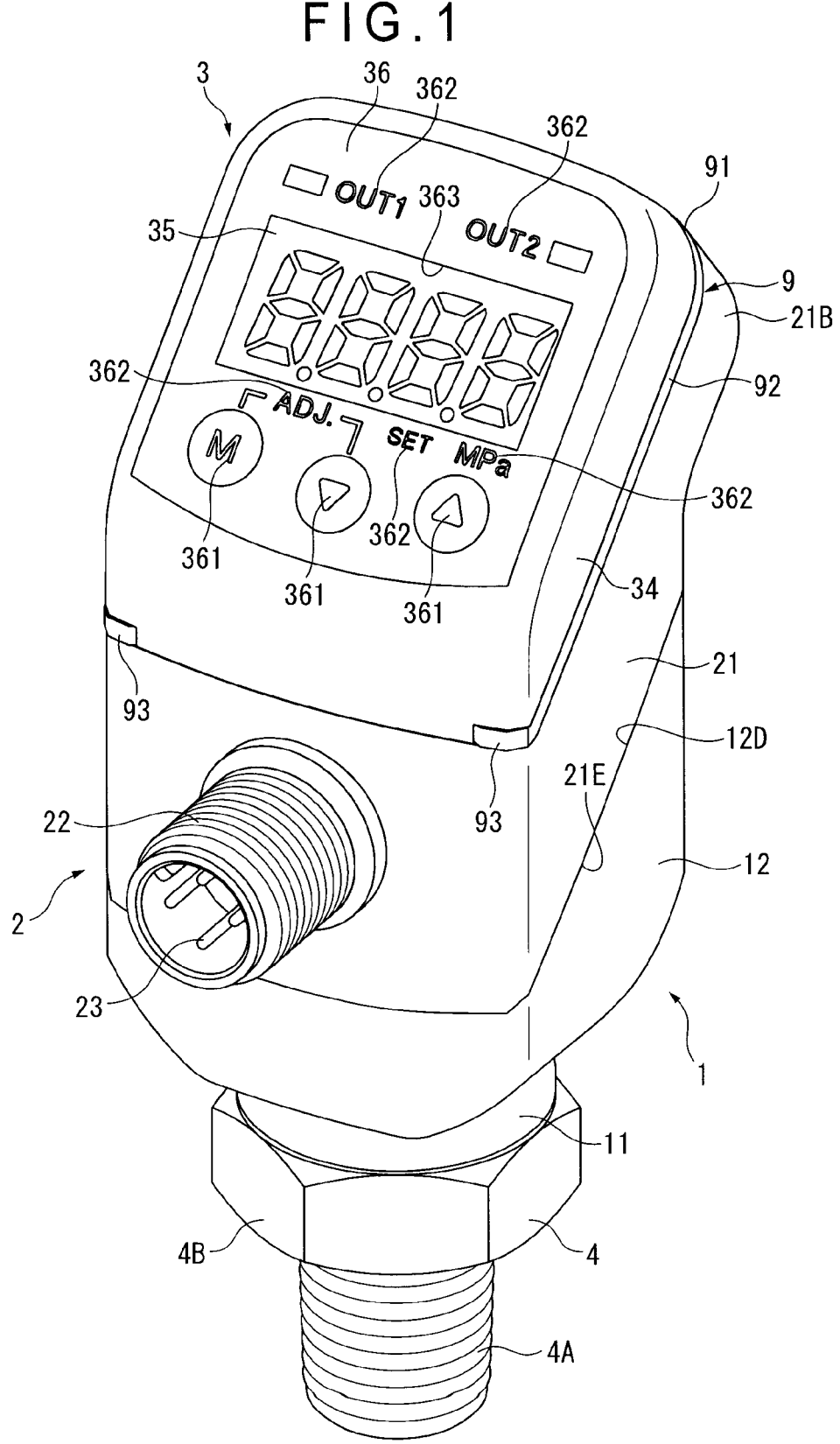
FIG. 1 is a perspective view showing an indicator according to a first exemplary embodiment of the invention.
Figure 2:
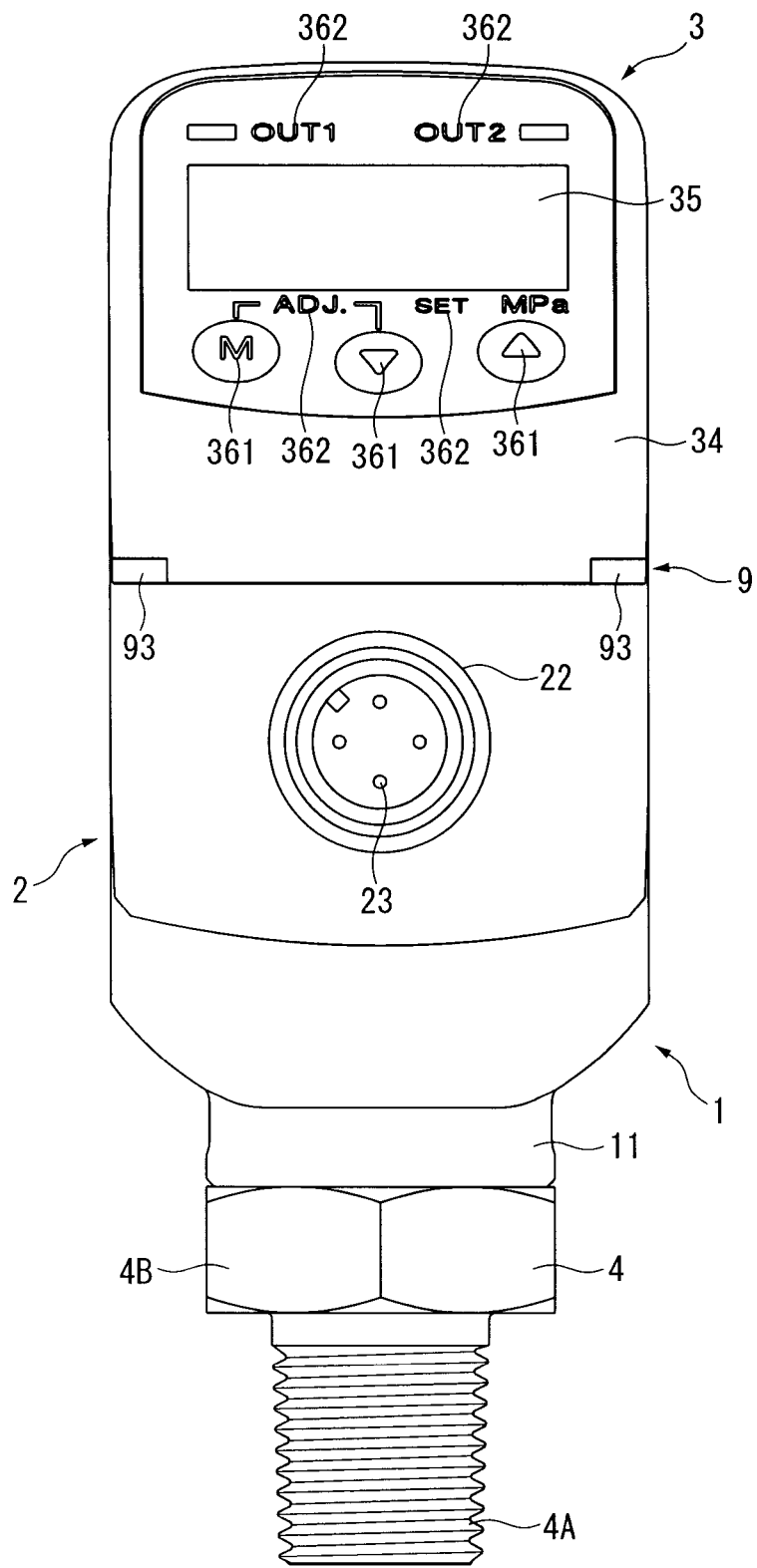
FIG. 2 is a front elevational view of the indicator.
Figure 3:
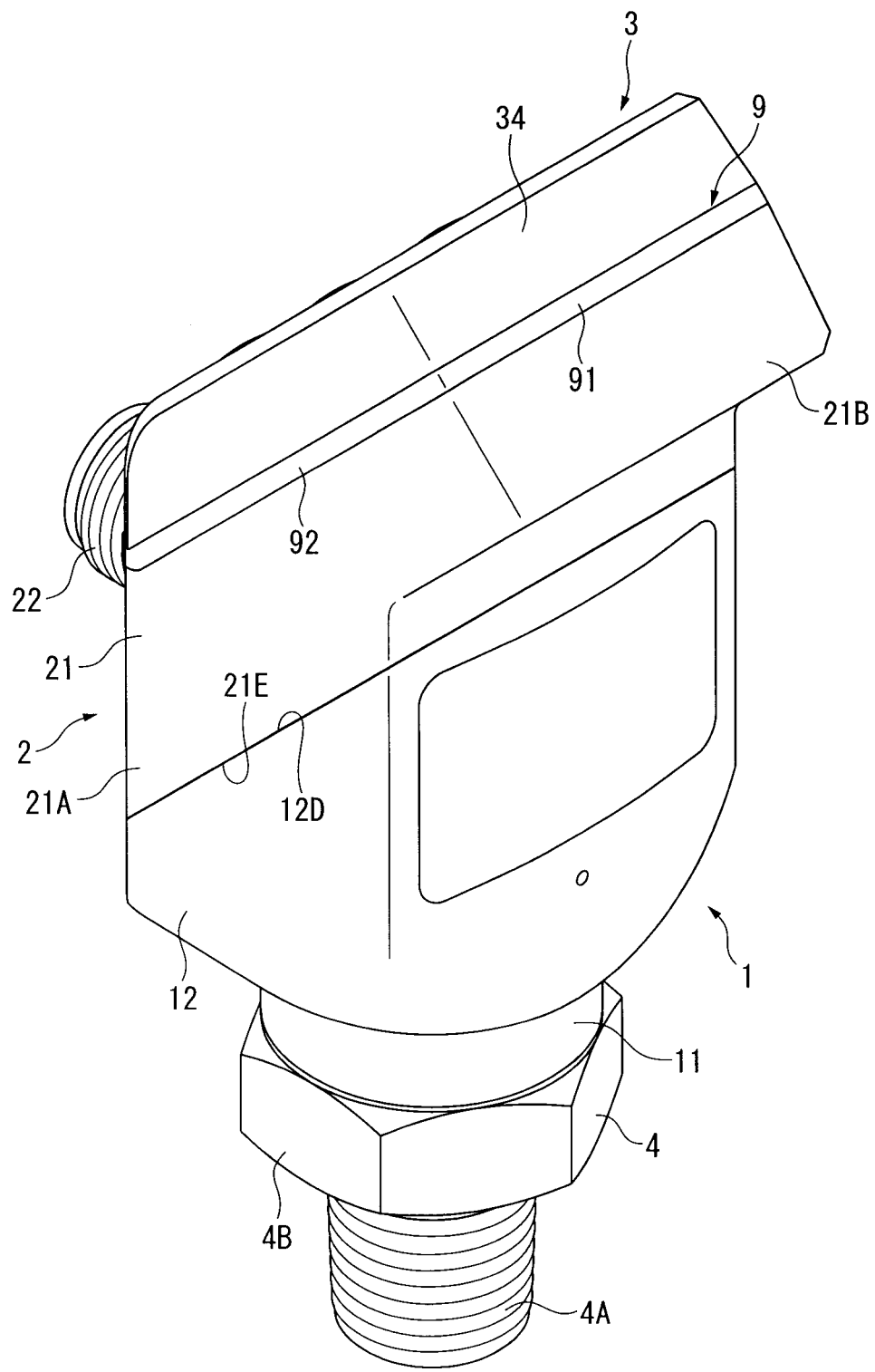
FIG. 3 is a perspective view showing an obliquely back side of the indicator.
Figure 4:
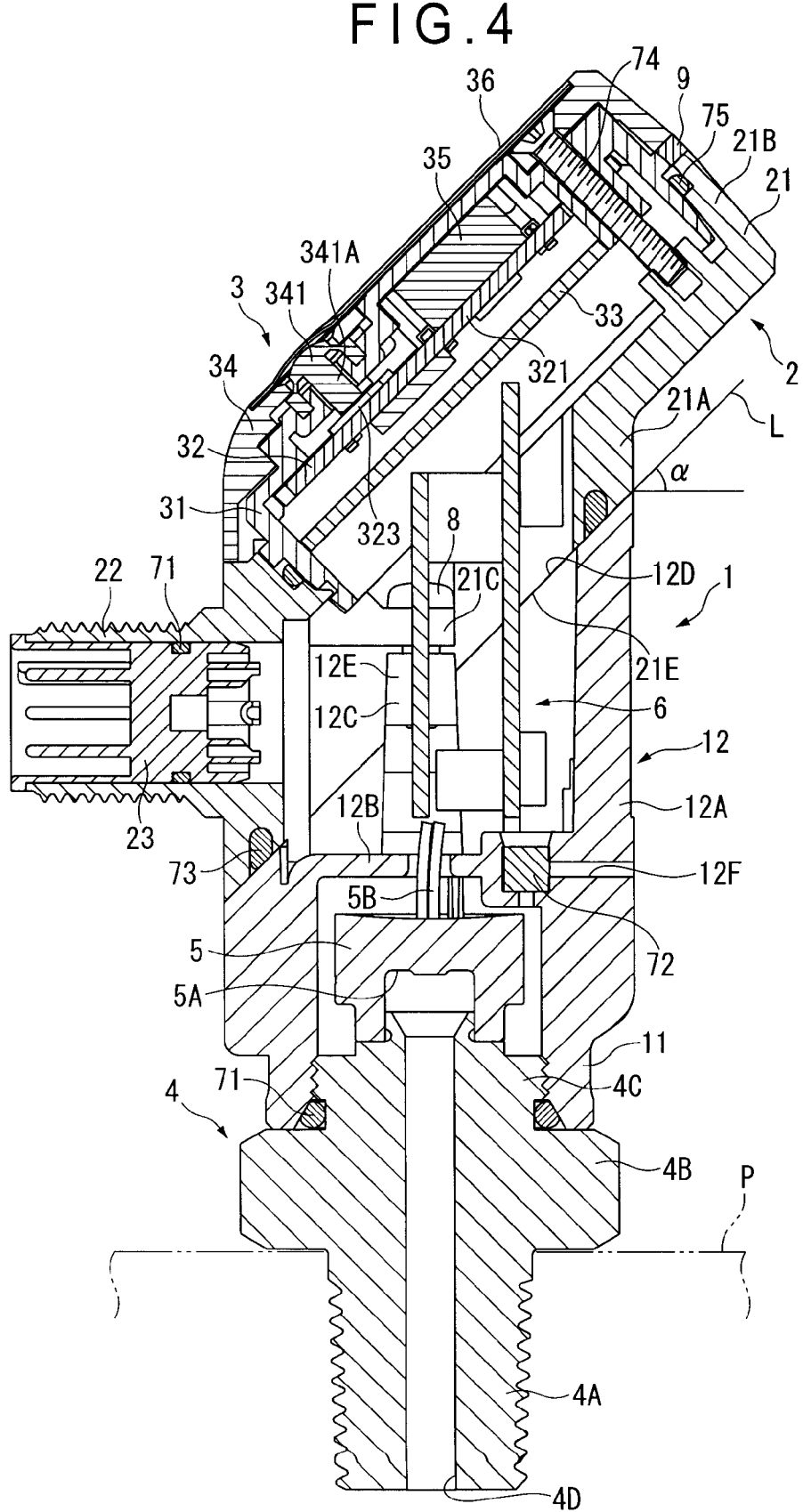
FIG. 4 is a cross section of the indicator.
Figure 5:
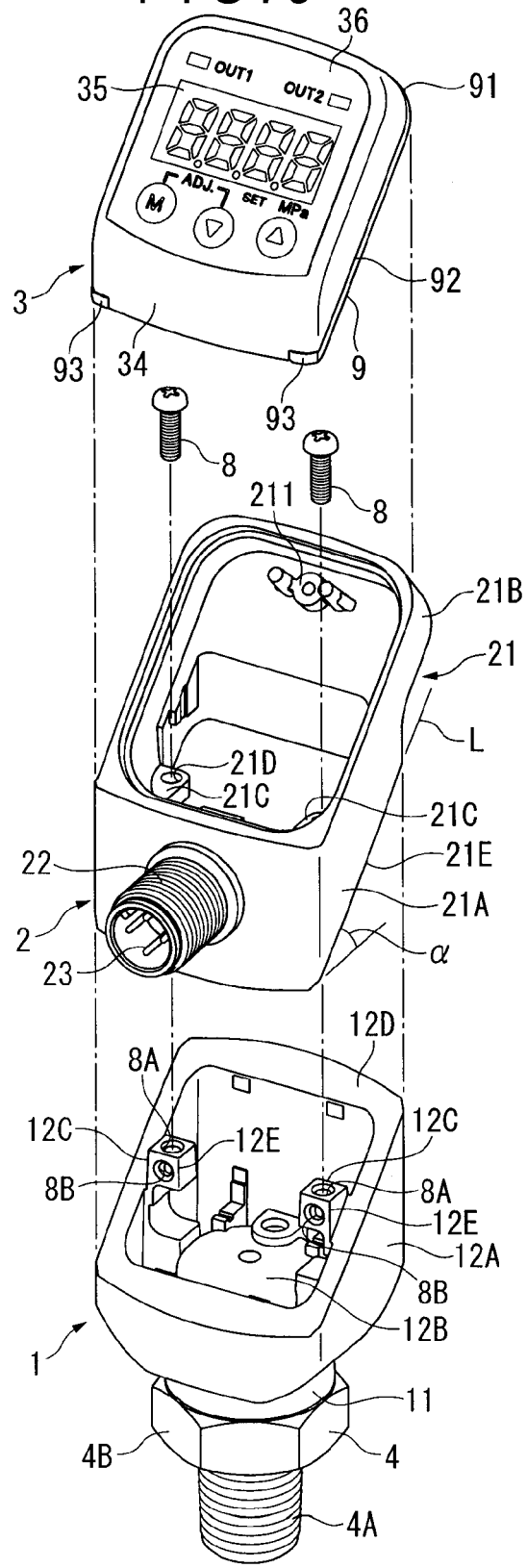
FIG. 5 is an exploded perspective view of the indicator.

FIG. 1 is a perspective view showing an entire arrangement of an indicator according to the first exemplary embodiment. FIG. 2 is a front elevational view of the indicator. FIG. 3 is a perspective view showing an obliquely back side of the indicator. FIG. 4 is a cross section of the indicator. FIG. 5 is an exploded perspective view of the indicator.

As shown in FIGS. 1 to 5, the indicator is a gauge pressure measurement indicator, including: a holder 1; a case 2 jointed on the holder 1; a display 3 provided on an upper opening end (first end) of the case 2; and a monitor indicator 9 provided between the display 3 and the case 2 for checking an operation of the indicator.

A joint 4 (connector) is attached to a lower end (first end) of the holder 1.

The joint 4 has: a pipe-side screw 4A screwed to a pipe P (attached portion); a flange 4B connected with the pipe-side screw 4A; and a holder-side screw 4C connected with the flange 4B. A pressure port 4D is formed along an axial center of the joint 4. The joint 4 is a component provided by cutting a stainless hexagonal rod.

A pressure sensor 5 is provided on an end of the holder-side screw 4C of the joint 4. The pressure sensor 5 is a end-closed cylindrical stainless component. The open end of the pressure sensor 5 is welded to the end of the holder-side screw 4C. The inner space of the pressure sensor 5 is in communication with the pressure port 4D to provide a pressure introducing recess 5A. A pressure detector such as a strain gauge is provided on a planar portion opposite to the pressure introducing recess 5A. An end of a cord 5B is connected to the pressure detector while the other end of the cord 5B is connected to a circuit board 6.

The holder 1 is provided with a female screw 11 screwed with the holder-side screw 4C and a holder body 12 jointed with the female screw 11.

The holder body 12 is an aluminum casting component, which includes: a square hollow portion 12A; a plate section 12B provided inside the square hollow portion 12A in a direction orthogonal to the axial center of the square hollow portion 12A; and projections 12C standing upright on the plate section 12B.

An O-ring 71 is provided between an inner open end of the female screw 11 and a recess formed at an intersection between the flange 4B and the holder-side screw 4C of the joint 4.

Outer circumferential corners of the square hollow portion 12A are chamfered to provide a gentle curve.

A joint surface 12D of the square hollow portion 12A adjacent to the case 2 is cut by a plane L intersecting with a plane orthogonal to an axial direction of the square hollow portion 12A at an angle α exemplarily of 45 degrees, i.e. angle α in a range defined between the axial direction (up and down direction in the figure) of the square hollow portion 12A and a perpendicular direction orthogonal to the axial direction. In the exemplary embodiment, the joint surface 12D is cut to provide a short front side of the square hollow portion 12A, a tall back side and 45 degree slopes on both sides.

The plate section 12B is provided with a hole at a center thereof. The cord 5B connected with the pressure detector of the pressure sensor 5 is inserted into the hole.

The projections 12C are respectively provided at the center of mutually opposing two inner walls of the square hollow portion 12A. Mutually opposing faces of the projections 12C are recessed at the center thereof, and a square body 12E is formed on a distal side relative to the recessed portion and the square body 12E projects upward relative to the joint surface 12D.

Female connectors 8A and 8B are provided on two sides of the square body 12E extending in mutually perpendicular directions, i.e. vertical direction and horizontal direction orthogonal to the vertical direction. The female connectors 8A and 8B are provided by female screws that are in communication with each other at the center thereof.

When a low pressure (pressure of less than 2 MPa) is to be detected, an air release hole 12F is provided on a backside of the square hollow portion 12A. A vent 72 is provided in the air release hole 12F.

The vent 72 is provided by a porous material that allows passage of external air while preventing passage of water and dust.

When a high pressure (pressure of 2 MPa or more) is to be detected, the air release hole 12F and the vent 72 are not necessary.

The case 2 includes a case body 21 and a cylindrical portion 22 provided on a front side of the case body 21. A male screw is provided on an outer circumference of the cylindrical portion 22 and a connector 23 is fitted in an inner circumference thereof. The connector 23 is used for supplying electric power from the outside and transmitting an output signal toward the outside. An O-ring 71 is interposed between an outer circumference of the connector 23 and the cylindrical portion 22.

The case body 21 is an aluminum casting component, which includes: a square hollow portion 21A jointed with the holder 1; a display attachment 21B integrally provided on the square hollow portion 21A; and a guide 21C integrally provided on an inner circumference of the square hollow portion 21A.

Outer circumferential corners of the square hollow portion 21A are chamfered to provide a gentle curve. The joint surface 21E of the square hollow portion 21A provided adjacent to the holder 1 is cut by the plane L that intersects with a plane orthogonal to the axial direction of the square hollow portion 21A at an angle α=45 degrees. In the arrangement shown in FIGS. 1 to 5, the square hollow portion 12A of the holder 1 is coaxial with the square hollow portion 21A of the case 2. Outer circumferences of the square hollow portions are continuously formed without any step. In other words, the ends (second ends) of the holder 1 and the case 2 are jointed to provide a substantially cylindrical hollow body.

As will be described below, the square hollow portion 21A of the case 2 is detachably attached to the square hollow portion 12A of the holder 1, where the attitude of the display 3 is adjusted by changing the attachment angle by 90 degrees within the plane L (see FIGS. 1 and 8).

A recess for fitting a gasket 73 is provided on the joint surface 21E of the square hollow portion 21A along the opening. The gasket 73 is an elastic rubber component, which is provided in order to seal the contact surface between the holder 1 and the case 2.

The backside of the display attachment 21B protrudes from the backside of the square hollow portion 21A. The display attachment 21B has an opening surface that is slanted by the angle α relative to the axial center of the square hollow portion 21A.

The guide 21C is respectively provided at the center of mutually opposing two inner walls of the square hollow portion 21A. A bolt insertion hole 21D is provided at the center of the guide 21C.

The guide 21C is a component that is projected from the inner wall of the square hollow portion 21A toward the axial center thereof. The lower side of the guide 21C is adapted to be in contact with the front or upper side of the square body 12E provided on the projection 12C of the holder 1. When the guide 21C is in contact with the front or upper side of the square body 12E, the bolt insertion hole 21D is aligned with the female connector 8A or 8B provided on the square body 12E. In this state, a male connector 8 (bolt) is inserted through the bolt insertion hole 21D to be connected with the female connector 8A or the female connector 8B.

The display 3 has: a substantially dish-shaped inner case 31 fitted into the display attachment 21B of the case 2: a display circuit board 32 provided in a recess under the inner case 31; a light-guiding plate 33 disposed opposite to a flat portion of the inner case 31 relative to the display circuit board 32; a cover 34 provided on an upper side of the inner case 31; and a shield 35 provided between the display circuit board 32 and the flat portion of the inner case 31. The inner case 31, the light-guiding plate 33 and the shield 35 are all provided by molding a synthetic resin.

The inner case 31 and the cover 34 are attached to the display attachment 21B of the case 2 via a screw 74. A gasket 75 is interposed between a periphery of the inner case 31 and the display attachment 21B.

Figure 6:
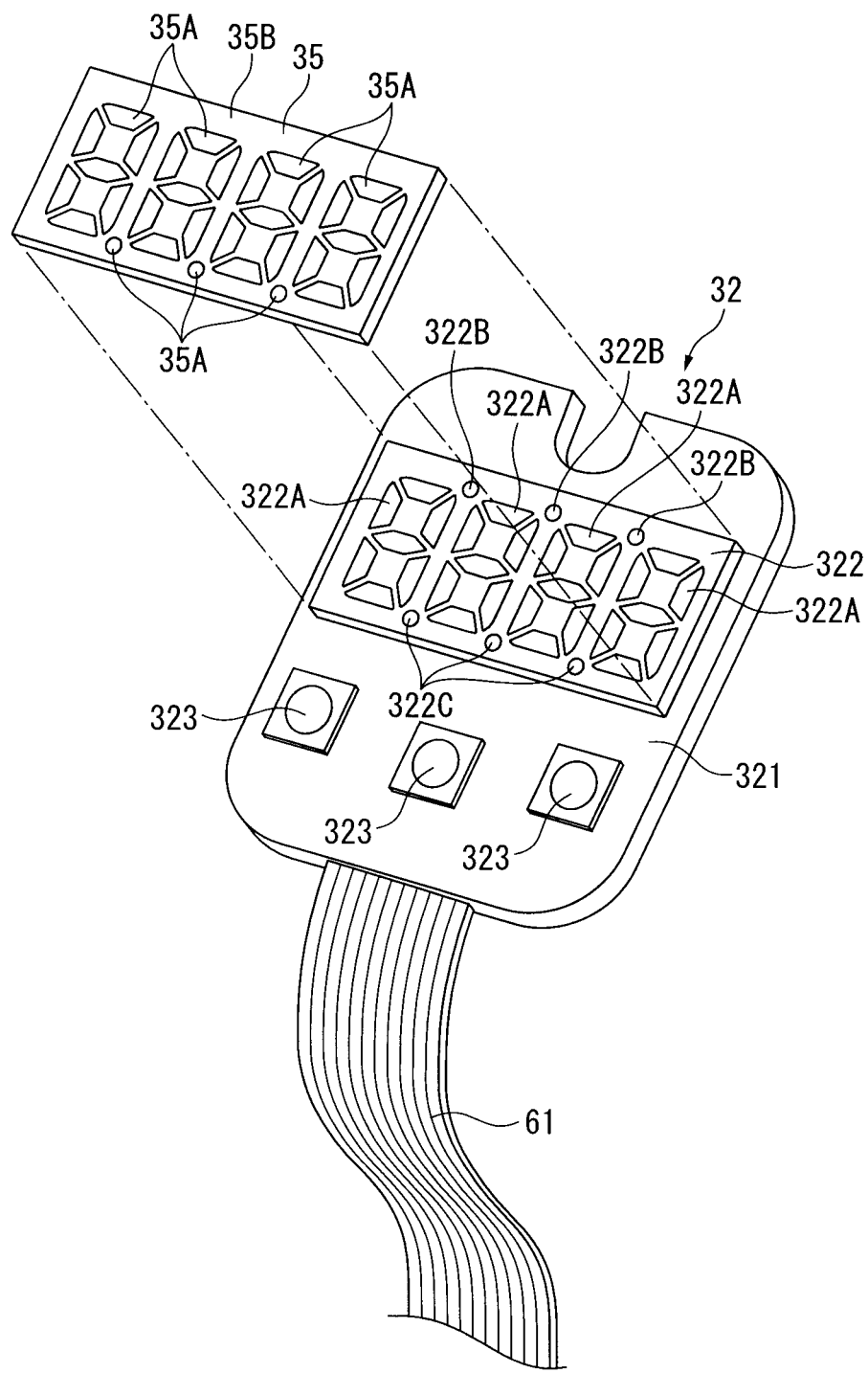
FIG. 6 is a perspective view of a display circuit board.

As shown in FIG. 6, the display circuit board 32 has: a printed circuit board 321 on which a CPU and a memory storing a display program are installed; and a numeral-display 322 and key-operating switches 323 respectively provided on the board 321. A circuit for driving the monitor indicator 9 and a circuit for driving the numeral-display 322 are installed on the printed circuit board 321. The printed circuit board 321 is supported by a board support 211 (see FIG. 3) provided at the bottom of the display attachment 21B.

The numeral-display 322 has a plurality of numeral portions 322A and decimal point portions 322B and 322C respectively disposed on the upper and lower sides between the adjacent numeral portions 322A, where a designated portion is lit in response to a signal from the CPU. In this exemplary embodiment, the numeral-display 322 is programmed to properly display a numeral even when the numeral-display 322 is vertically reversed. In this case, both of the decimal point portions 322B and 322C are displayed.

The shield 35 is detachably provided over the numeral display 322 in a manner capable of up-and-down (vertical) conversion.

The shield 35 includes: a light-transmitting portion 35A that transmits the light from the numeral portion 322A and the lower decimal point portions 322C; and a shielding portion 35B that shields a planar rectangular area including the upper decimal point portions 322B, the shielding portion 35B occupying the entire area except for the light-transmitting portion 35A. Though the shield 35 can be produced by various processes, the shield 35 is exemplarily produced by providing openings on a glass plate for chip LEDs each partitioning the openings to avoid interference with the light emitted from the other chip LEDs in this exemplary embodiment.

In the arrangement shown in FIGS. 1 to 5, the cover 34 is provided with depressable key tops 341 for operating the key-operating switch 323.

The key top 341 is an elastic rubber component that has three shafts 341A (only one of which is shown in FIG. 4) arranged on a plane of the display circuit board 32. The shafts 341A are respectively capable of displacement in response to an axial force applied thereon.

A water-resistant double-sided adhesive tape (not shown) is adhered on the inner case 31 for attaching the inner case 31 to the cover 34. The key-operating switch 323 includes a "mode key", "down key" and "up key", which are used to switch the operation modes and change the set value.

A panel sheet 36 (numeral-displaying face) is attached on the cover 34. A display area 361 that receives the operation on the key-operating switch 323 and a display area 362 for displaying a character code such as "OUT1", "OUT2" and "SET" are provided on the surface of the panel sheet 36. A window 363 for viewing the numeral-display 322 through the shield 35 is provided on the panel sheet 36.

In this exemplary embodiment, the numeral-display 322 and the monitor indicator 9 are controllably lit by a controller (not shown). The controller sets the operation modes of the numeral-display 322 and the monitor indicator 9 so that the numeral-display 322 and the monitor indicator 9 are simultaneously lit or the numeral-display 322 is unlit while lighting the monitor indicator 9. The numeral-display 322 may be automatically redisplayed in synchronization with an abnormal display of the monitor indicator 9. Alternatively, the numeral-display 322 may be redisplayed by pressing the display area 361 to operate one of the three key-operating switches 323 provided on the cover 34. When the numeral-display 322 is to be redisplayed by switch operations, the numeral-display 322 may be unlit again after passing a predetermined time (e.g. 10 seconds) or when no switch operation is conducted for a predetermined time (e.g. 1 minute).

In this exemplary embodiment, the cover 34 is a first housing and the case body 21 is a second housing. The cover 34 and the case body 21 provide an external wall by the four planes circumferentially continuous with each other. The external wall is substantially orthogonal to the cover 34.

The monitor indicator 9 is provided by a light-transmissive glass, synthetic resin and the like, which is held between the cover 34 and the case body 21. The outer periphery of the monitor indicator 9 is arranged to be substantially flush with the external wall of the case body 21 and the cover 34. In this exemplary embodiment, the outer periphery of the monitor indicator may be inwardly recessed from the external wall of the case body 21 and the cover 34.

The monitor indicator 9 includes: a back portion 91 disposed on the external wall on the backside of the case body 21; a side portion 92 disposed on the external wall on both sides of the case body 21; and a front portion 93 partially disposed on the external wall on the front side of the case body 21.

Figure 7:
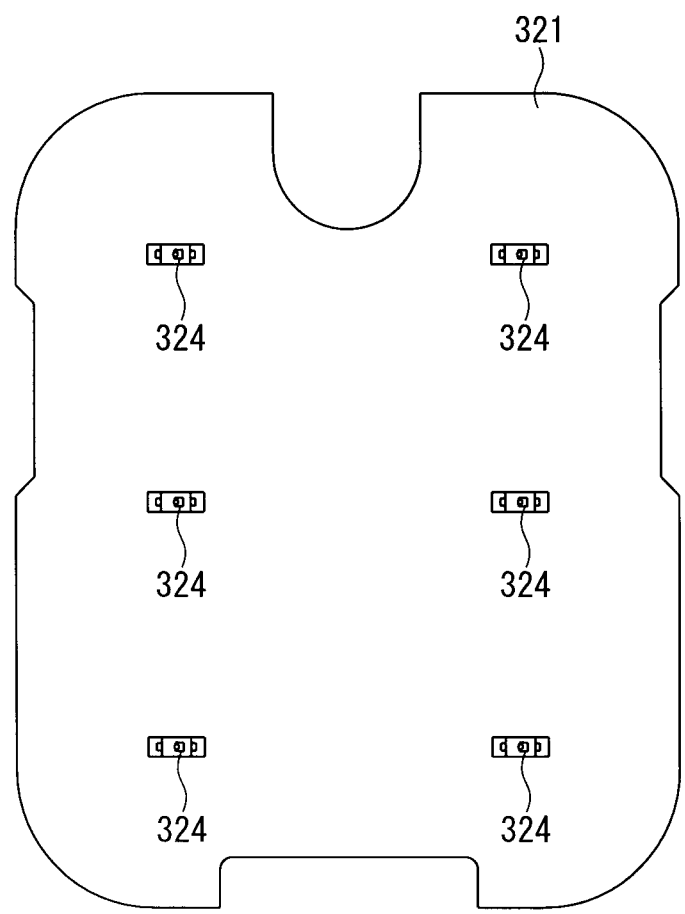
FIG. 7 is a front elevational view of a printed circuit board provided with chip LEDs.

The light source of the monitor indicator 9 is a chip LED 324. The chip LED 324 is provided on a printed circuit board 321 (see FIG. 7). The light issued by continuously lighting or flashing the chip LED 324 is transmitted through the light-guiding plate 33 opposed to the board 321 to be displayed on the monitor indicator 9.

The information displayed by the monitor indicator 9 is a preset alarm information that is issued when, for instance, the detected pressure falls below or exceeds a predetermined pressure threshold, where an open collector output is set on to continuously light or flash the chip LED 324.

The chip LED 324 of the monitor indicator 9 may be unicolor (e.g. red only) or a combination of any two colors (for instance a combination of green and red). When the light is unicolor (e.g. red), the LED may be lit (or flashed) when an alarm is issued. When the chip LED 324 emits two colors of green and red, the chip LED may be lit green in a normal state and may be lit red when an alarm is issued, where ON and OFF of the power of the indicator can be checked.

When a plurality of messages are to be sent by the alarm, the number of colors of the chip LED 324 may further be increased or, when the chip LED 324 is unicolor, the message represented by the LED may be distinguished by the lighting mode (continuous lighting or flashing) and flashing speed.

The circuit board 6 is an analog circuit that controls a power source, comparator output and analog output, which is connected with the display circuit board 32 via a flexible circuit board 61.

The circuit board 6 is disposed inside the holder body 12 of the holder 1.

A predetermined amount of mold component is injected into the inside of the holder body 12. The mold component fixes the circuit board 6, dissipates the heat of heat-generating electronic components and reduces the inner volume of the holder body. Incidentally, it is not requisite to provide the mold component in this exemplary embodiment.

An assembly process of the indicator of this exemplary embodiment will be described below with additional reference to FIGS. 8 and 9.

Initially, when the joint 4 is attached to the pipe P at an upper portion thereof, the indicator shown in FIGS. 1 to 7 is used.

The holder 1 and the case 2 of the indicator are superposed so that the axial directions are aligned. In this state, the upper face of the square body 12E of the projection 12C provided on the holder 1 and the lower face of the guide 21C provided on the case 2 are superposed to align the axial centers of the female connector 8A vertically provided on the square body 12E and the bolt insertion hole 21D. Then, the male connector 8 is inserted into the bolt insertion hole 21D to be screwed with the female connector 8A.

Subsequently, the display 3 is attached to the case 2. Specifically, the inner case 31 and the cover 34 are attached to the display attachment 21B of the case 2 by the screw 74 and the panel sheet 36 is adhered on the cover 34. Incidentally, the shield 35 is attached in advance to the numeral-display 322 of the display circuit board 32 in this exemplary embodiment so that the upper decimal point portions 322B are hidden and the numeral portions 322A and the lower decimal point portions 322C are visible as shown in FIG. 6.

Figure 8:
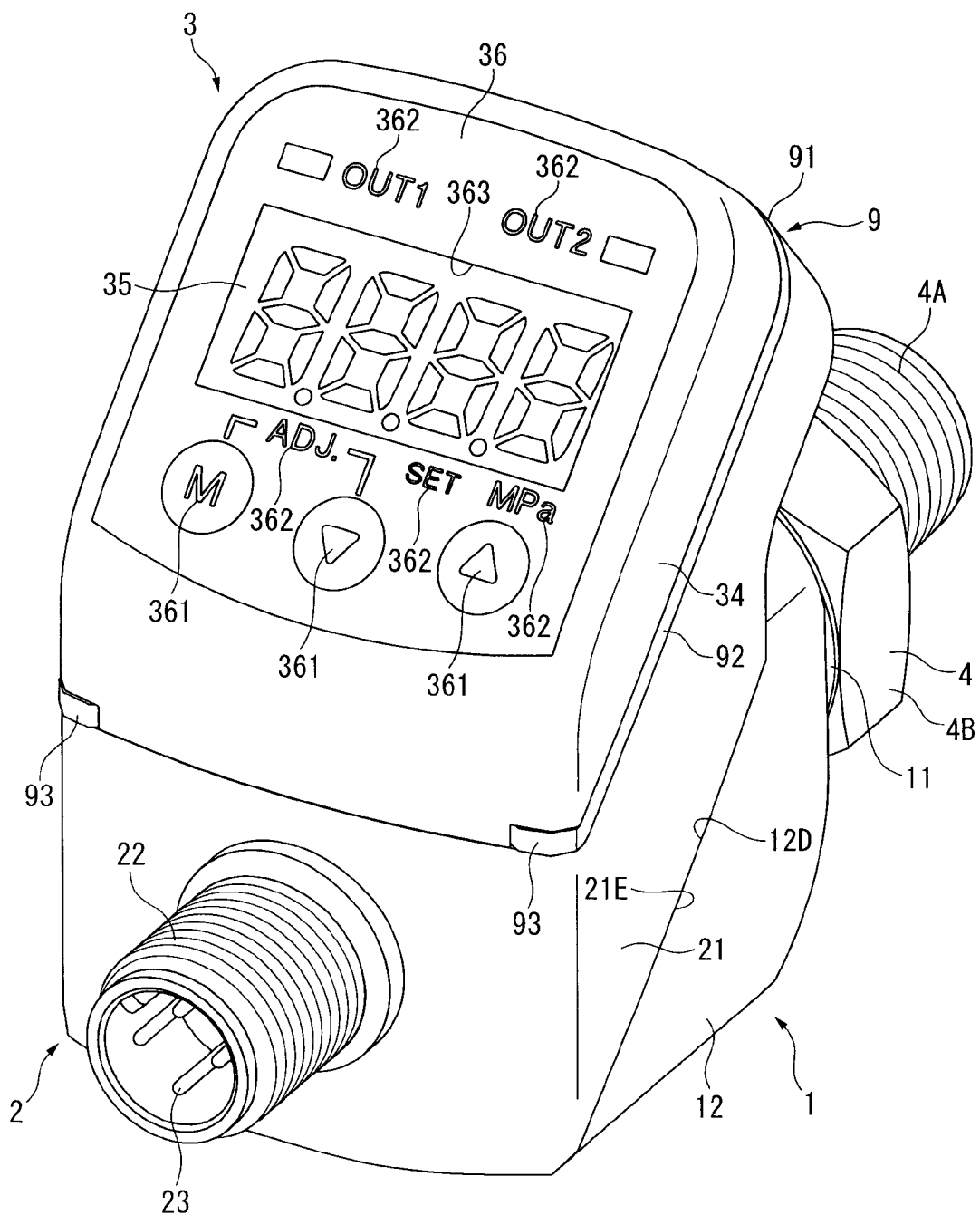
FIG. 8 is a perspective view of another indicator that is assembled in a different process.

When the joint 4 is horizontally attached to the pipe P, the indicator shown in FIG. 8 is used.

The holder 1 and the case 2 of the indicator are superposed so that the axial directions thereof are intersected. In this state, the front face of the square body 12E of the projection 12C provided on the holder 1 and the guide 21C provided on the case 2 are superposed to align the axial centers of the female connector 8B horizontally provided on the square body 12E and the bolt insertion hole 21D. Then, the male connector 8 is inserted into the bolt insertion hole 21D to be screwed with the female connector 8B. Subsequently, the display 3 is attached to the case 2.

Figure 9:
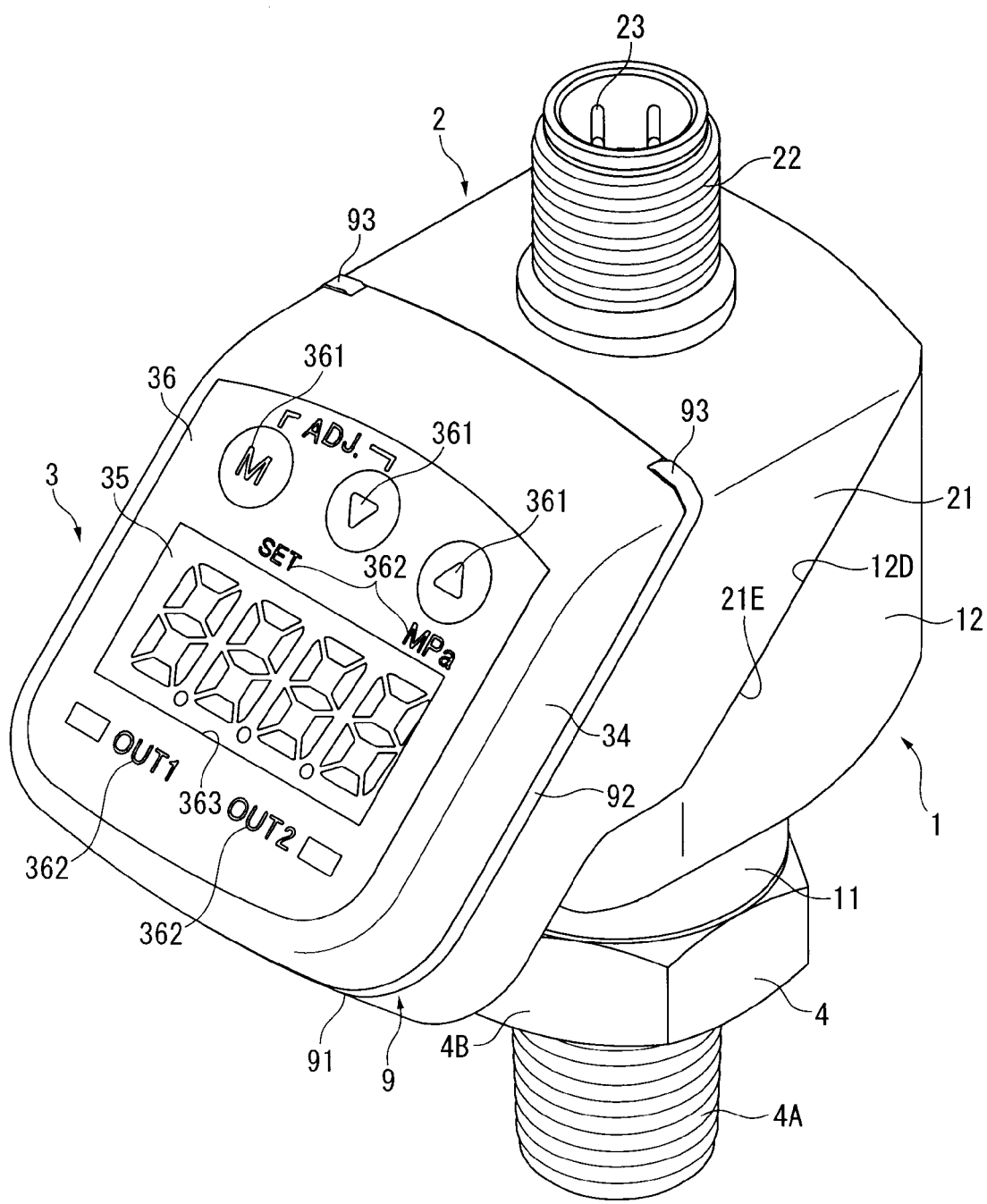
FIG. 9 is a perspective view of still another indicator that is assembled in a different process.

When the joint 4 is attached to an upper part of the pipe P with the connector 23 being upwardly provided, the indicator shown in FIG. 9 is used.

Similarly to the indicator of FIG. 8, the display 3 of this indicator is attached to the case 2 after the holder 1 and the case 2 are superposed so that the axial directions thereof are intersected. In this arrangement, the up-and-down direction (top-and-bottom direction) of the display 3 is opposite to the indicator shown in FIGS. 1 to 7.

Accordingly, the numeral-display 322 is programmed to display the numerals upside down. Further, when the shield 35 is attached to the numeral-display 322 of the display circuit board 32, the shield 35 covers the lower decimal point portions 322C while exhibiting the numeral portions 322A and the upper decimal point portions 322B.

The following advantages can be obtained in this exemplary embodiment.

(1) Since the numeral-displaying face 36 provided with the numeral-display 322 and the exterior wall intersecting the periphery of the numeral-displaying face 36 are provided on the cover 34 and the case body 21 and the monitor indicator 9 for checking the operating condition of the indicator is provided on the exterior wall, the operating condition of the indicator can be visually checked via the monitor indicator 9 by an operator located at a position where the numeral-display 322 is not viewable. Further, since the outer circumference of the monitor indicator 9 is flush with or inwardly recessed relative to the exterior wall, the monitor indicator 9 does not collide with an accidentally fallen object, thereby preventing the damage on the monitor indicator 9.

(2) The exterior wall of the cover 34 and the case body 21 are provided by four planes continuous with each other and the monitor indicator 9 is provided on all of the four planes. Accordingly, the monitor indicator 9 can be visually checked in all of the four directions.

(3) The light source of the monitor indicator 9 is an LED. With the increase in the lifetime of an LED, the indicator can be manufactured at a low cost. Further, a variety of colors can be created by combining a plurality of colors.

(4) Since the LED of the monitor indicator 9 is continuously lit or flashed, the visibility can be further enhanced.

(5) Since the circuit for driving the monitor indicator 9 and the circuit for driving the numeral-display 322 are installed on the printed circuit board 321, it is not necessary to separately provide wirings for the indicators, thereby reducing the size of the indicator and simplifying the process for manufacturing the indicator.

(6) Since the monitor indicator 9 is held between the cover 34 and the case body 21, both sides of the monitor indicator 9 are protected by the cover 34 and the case body 21. Accordingly, even when a fallen object collides with the cover 34, the damage on the monitor indicator 9 itself can be prevented.

(7) Since the joint 4 and the connector 23 are provided on the case body 21, the power necessary for driving the numeral-display 322 and the monitor indicator 9 is supplied through the connector. Accordingly, it is not necessary to install a battery inside the indicator.

(8) The controller for turning off the numeral-display 322 while lighting only the monitor indicator 9 reduces power consumption by turning off only the numeral-display 322. Even when the numeral-display 322 is turned off, since the monitor indicator 9 is lit, abnormality in pressure value can be checked via the monitor indicator 9.

(9) The holder 1 of which first end is provided with the joint 4 to be attached to the pipe P and the case 2 of which first end is attached with the display 3 are jointed together at their second ends, and the joint surface of the holder 1 and the case 2 is cut at an angle in the range defined between the axial direction of the cylinder body and the perpendicular direction orthogonal to the axial direction, so that the holder 1 and the case 2 are adapted to be connected at a posture along the axial direction of the cylindrical body and at a posture along a direction intersecting the axial direction. Accordingly, it is not necessary to change an attitude for viewing the display 3 irrespective of the attachment position of the joint 4 to the pipe P (i.e. at an upper portion or a horizontal portion) by changing the joint posture of the holder 1 to the case 2 by 90 degrees. Further, since no extra attachment portion is provided on the holder 1 and the case 2, no plug and the like for closing the attachment is required, so that the indicator can be manufactured at a low cost. Further, since it is not necessary to provide a projection in order to joint the case 2 and the holder 1, the size of the indicator can be reduced.

Next, a second exemplary embodiment of the invention will be described below with reference to FIGS. 10 and 11. The second exemplary embodiment is the same as the first exemplary embodiment except for the shape of the housing and the arrangement of the monitor indicator. In the second exemplary embodiment, the same elements as those of the first exemplary embodiment will be denoted by the same reference numerals to omit the description thereof.

Figure 10:
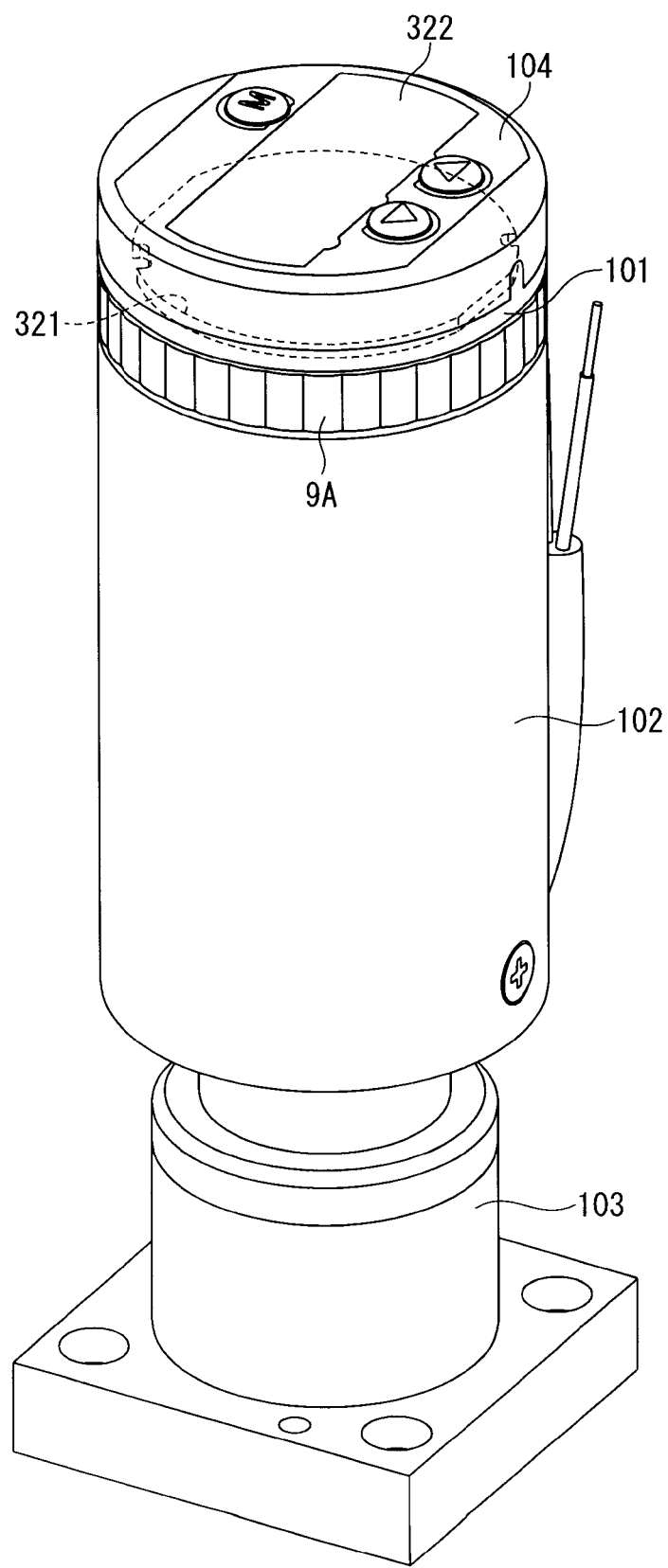
FIG. 10 is a perspective view showing an indicator according to a second exemplary embodiment of the invention.
Figure 11:
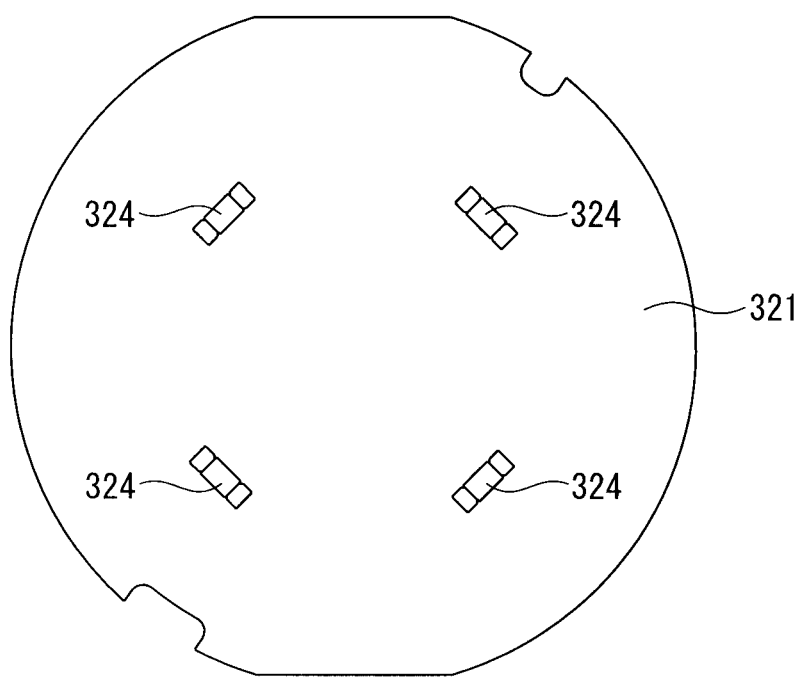
FIG. 11 is a front elevational view of a printed circuit board provided with chip LEDs.

FIG. 10 is a perspective view showing an indicator according to the second exemplary embodiment.

As shown in FIG. 10, the indicator is provided with a cylindrical first housing 101 and a second cylindrical housing 102. An attachment 103 is connected to a lower end of the second housing 102.

The first housing 101 and the second housing 102 have the same outer diameter.

An upper end orthogonal to an exterior wall of the first housing 101 defines a numeral-displaying face 104, on which a numeral-display 322 is provided. A monitor indicator 9A is provided on the exterior wall. An outer circumference of the monitor indicator 9A is flush with the exterior wall. In this exemplary embodiment, the outer circumference of the monitor indicator 9A may be inwardly recessed.

The monitor indicator 9A is held between the first housing 101 and the second housing 102 and is provided along the circumference of the housings 101 and 102 (i.e. substantially annularly).

In the second exemplary embodiment, the circuit for driving the monitor indicator 9A, the circuit for driving the numeral-display 322 and the chip LEDs 324 are installed on the printed circuit board 321 similarly to the first exemplary embodiment. However, the printed circuit board 321 is disk-shaped in accordance with the outer configuration of the housings 101 and 102 (see FIG. 11).

Similarly to the first exemplary embodiment, a mechanism for detecting the pressure, a mechanism for driving the monitor indicator 9A and a mechanism for driving the numeral-display 322 are provided inside the housings 101 and 102.

In the second exemplary embodiment, the following advantage can be achieved as well as the advantages (1), (3) to (6) and (8) in the first exemplary embodiment.

(10) The first housing 101 and the second housing 102 are provided as cylindrical components and the monitor indicator 9A is provided entirely along the outer circumference of the curved exterior wall of the housings 101 and 102. Accordingly, the monitor indicator 9A is visible in any directions, so that visibility of the monitor indicator 9A is enhanced.

Incidentally, the scope of the invention is not restricted to the above exemplary embodiments, but includes modifications, improvements and the like as long as they are compatible with the invention.

For instance, though the light source of the monitor indicators 9 and 9A are LED(s) in the exemplary embodiments, a light source other than LED(s), e.g. a light bulb, may be used in the invention. It is not required to use a chip LED as in the exemplary embodiments, but a dip LED may alternatively be used.

An alarm sound may be issued together with lighting the light source such as LEDs.

The housing does not have to be separated into the first housing and the second housing. The invention can be applied to an indicator having a single unitary housing.

The invention may be applied to an indicator of a pressure sensor for measuring absolute pressure or differential pressure instead of a pressure sensor for measuring gauge pressure. The invention can be applied to a detector such as a temperature sensor instead of a pressure sensor.

What is claimed is:

1. An indicator, comprising:
a housing that has a numeral-displaying face comprising a numeral-display and an exterior wall intersecting a periphery of the numeral-displaying face; and
a monitor display provided on the exterior wall that is adapted to display alarm information, the monitor display comprising an outer circumference that is flush with the exterior wall or is recessed relative to the exterior wall.

2. The indicator according to claim 1, wherein
the exterior wall is provided by a plurality of flat surfaces continuous with each other, at least one of the plurality of flat surfaces being provided with the monitor display.

3. The indicator according to claim 2, wherein
the monitor display is continuously extended to two or more adjacent ones of the plurality of flat surfaces.

4. The indicator according to claim 3, wherein
the housing comprises a first housing and a second housing that are separated in a direction intersecting the exterior wall, the monitor display being held between the first housing and the second housing.

5. The indicator according to claim 1, wherein
a light source of the monitor display is an LED that is continuously lit or is flashed.

6. The indicator according to claim 5, wherein
a circuit for driving the monitor display and a circuit for driving the numeral-display are installed on a single printed circuit board.

7. The indicator according to claim 1, further comprising:
a controller that turns off the numeral-display while lighting only the monitor display.

8. The indicator according to claim 1, wherein
the exterior wall is curved, the monitor display being provided along a circumference of at least a part of the curve.

9. The indicator according to claim 8, wherein
the housing comprises a first housing and a second housing that are separated in a direction intersecting the exterior wall, the monitor display being held between the first housing and the second housing.

* * * * *